US00H002226H

(19) United States
(12) Statutory Invention Registration
Pi

(10) Reg. No.: US H2226 H
(43) Published: Nov. 4, 2008

(54) MOUSE CABLE MANAGEMENT

(75) Inventor: Sharon Pi, Anaheim, CA (US)

(73) Assignee: Targus Group International, Inc., Anaheim, CA (US)

(21) Appl. No.: 11/698,822

(22) Filed: Jan. 26, 2007

(65) Prior Publication Data

US 2008/0204414 A1 Aug. 28, 2008

(51) Int. Cl.
*G06F 3/033* (2006.01)
*G09G 5/08* (2006.01)

(52) U.S. Cl. ..... 345/166; 345/163; 191/12.4; 191/12.2 R

(58) Field of Classification Search ..... 345/166, 345/163; 191/12.4, 12 R
See application file for complete search history.

(56) References Cited

U.S. PATENT DOCUMENTS

2005/0178633 A1 * 8/2005 Liao ..... 191/12.4
2008/0204414 A1 * 8/2008 Pi ..... 345/166

* cited by examiner

*Primary Examiner*—Dan Pihulic
(74) *Attorney, Agent, or Firm*—Stoel Rives LLP

(57) ABSTRACT

Disclosed are embodiments of portable electronic devices, such as computer mice, which have structures for temporarily storing a cable and/or electrical connector between uses. Some embodiments include structures and/or mechanisms for releasably attaching the electrical connector with a computer mouse or other peripheral device. Some embodiments may also include a storage mechanism for storing at least a portion of the cable. The storage mechanism may comprise a cable winding mechanism. Thus, the cable and electrical connector of the device may be conveniently stored for travel and/or between uses. In some embodiments designed for use in connection with optical mice, the device may also be configured such that an optical component window is covered while the cable and/or electrical connector are being temporarily stored.

18 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MOUSE CABLE MANAGEMENT

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings in which.

DETAILED DESCRIPTION OF PREFERRED EMBODIMENTS

Figure 1:
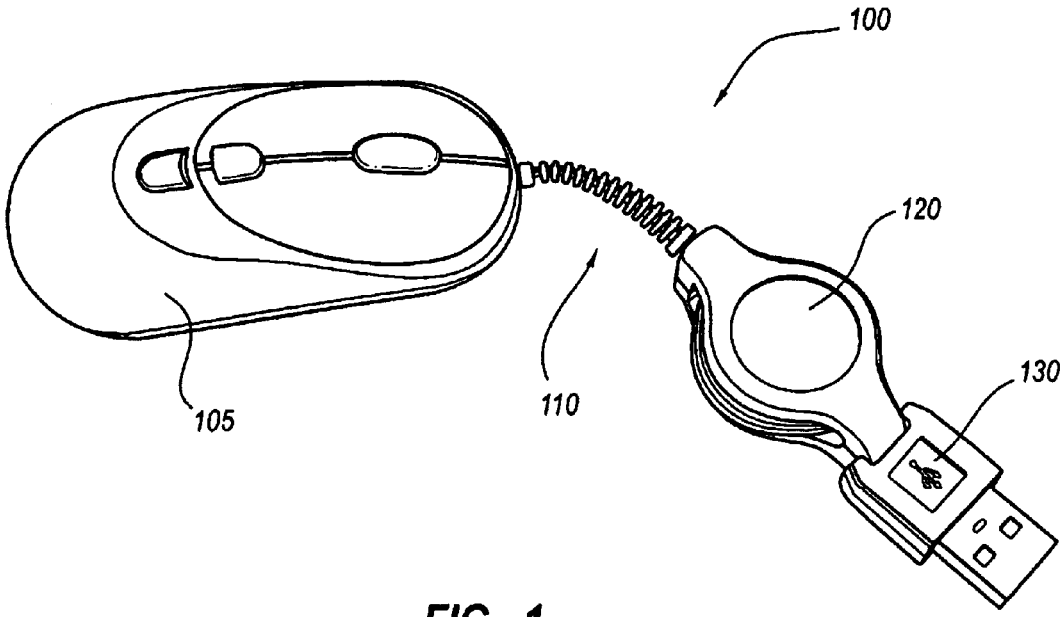
FIG. 1 is a perspective view of one embodiment of a portable mouse device.

In the following description, numerous specific details are provided for a thorough understanding of specific preferred embodiments. However, those skilled in the art will recognize that the invention can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in one or more embodiments.

Disclosed are embodiments of portable electronic devices, such as computer mice, which have structures for temporarily storing a cable and/or electrical connector, such as a Universal Serial Bus (USB) connector, between uses. For example, some embodiments include structures and/or mechanisms for releasably attaching the electrical connector with a computer mouse or other peripheral device. Some embodiments may also include a storage mechanism for storing at least a portion of the cable. The storage mechanism may comprise a cable winding mechanism. Examples of suitable cable winding mechanisms for use in connection with the invention disclosed herein can be found in U.S. Pat. No. 6,733,328 titled "USB Cable Adapter with Cable Winding Mechanism," which is hereby incorporated by reference in its entirety.

With reference to the accompanying drawings, further details of particular embodiments of the invention will now be disclosed in greater detail. In FIGS. 1–5, a computer mouse device 100 is shown. Computer mouse device 100 comprises a computer mouse 105 having a cable 110 extending therefrom. A storage mechanism 120 is also provided for storing at least a portion of the cable 110. In the depicted embodiment, storage mechanism 120 comprises a cable winding mechanism. An electrical connector 130 is connected with cable 110 for electrically connecting the computer mouse 105 with a computer (not shown). The majority of the length of cable 110 is wound within cable winding mechanism 120 in the figures, but can be released to allow the connector 130 to be separated from mouse 105 by a greater distance. In some embodiments, cable winding mechanism 120 may be configured to allow for connector 130 to be separated from mouse 105 by any of a plurality of fixed distances.

Figure 2:
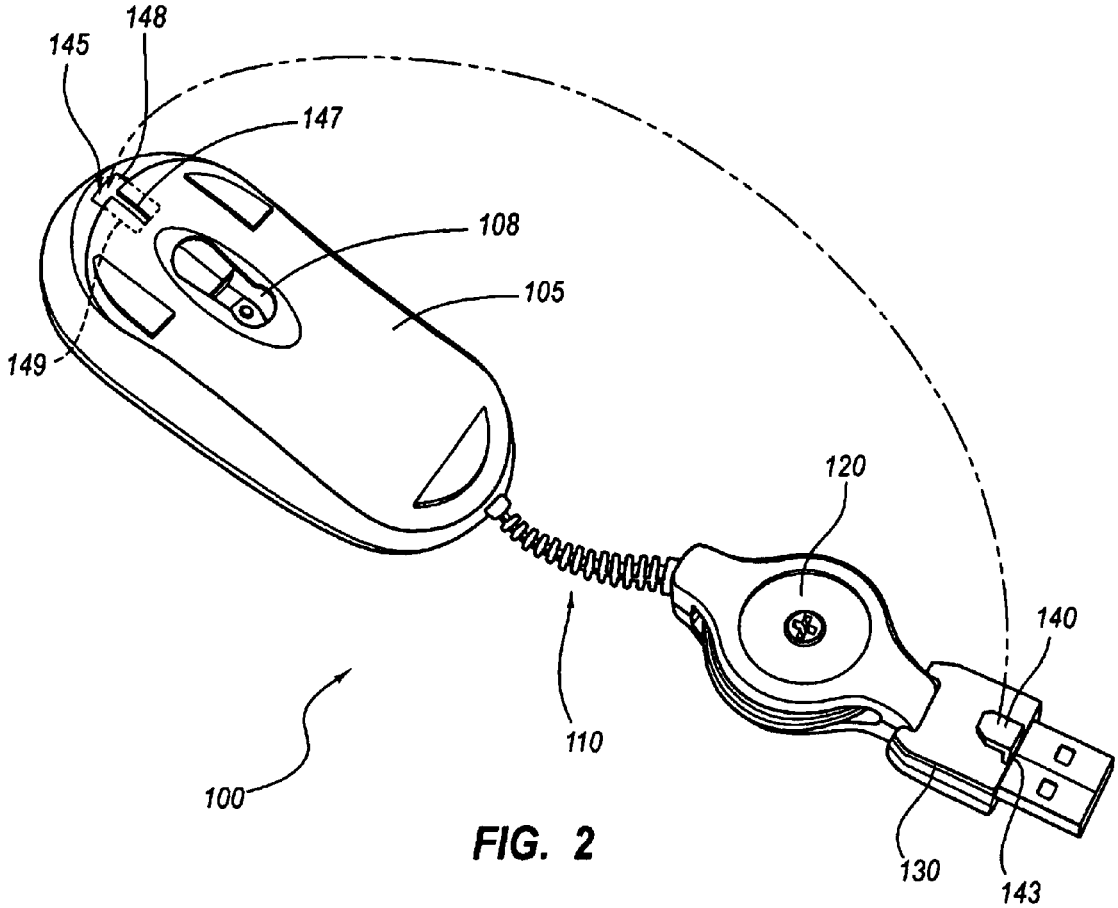
FIG. 2 is another perspective view of an embodiment of a portable mouse device showing a male component and a corresponding female component for temporarily storing an electrical connector and a cable winding mechanism of the device.

As shown in FIG. 2, device 100 also includes an attachment member 140 for releasably attaching the electrical connector 130 with the computer mouse 105. As indicated by the dashed arrow in FIG. 2, attachment member 140 is configured to be received within a female component 145 formed within the housing of mouse 105 to releasably attach electrical connector 130 thereto.

Figure 3:
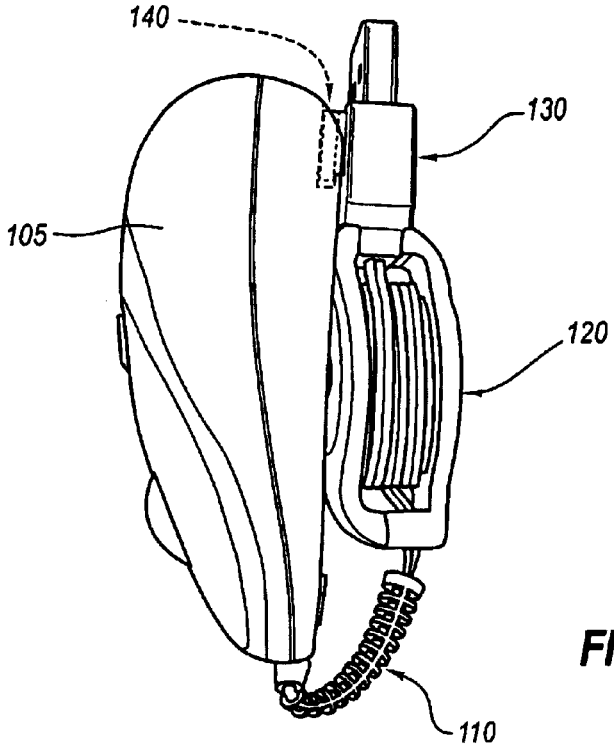
FIG. 3 is a side view of an embodiment of a portable mouse device shown with the electrical connector temporarily attached to the mouse.
Figure 4:
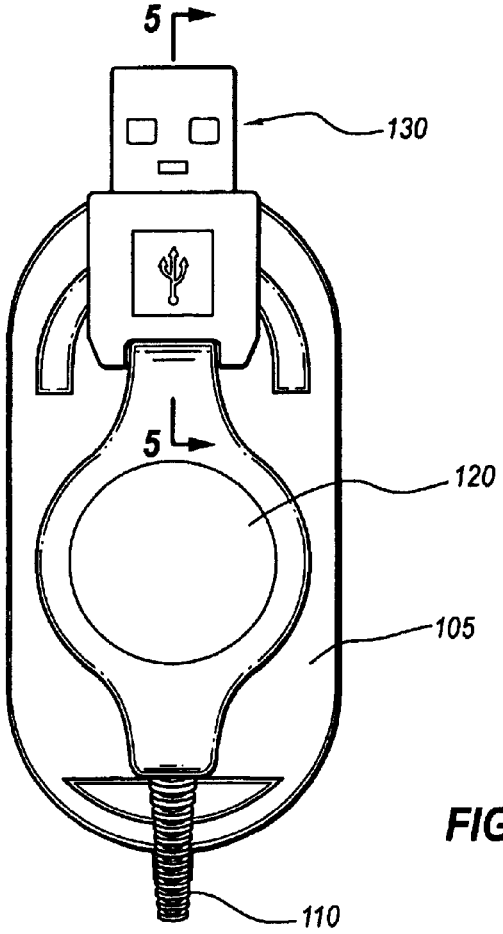
FIG. 4 is a bottom plan view of the portable mouse device of FIG. 3.
Figure 5:
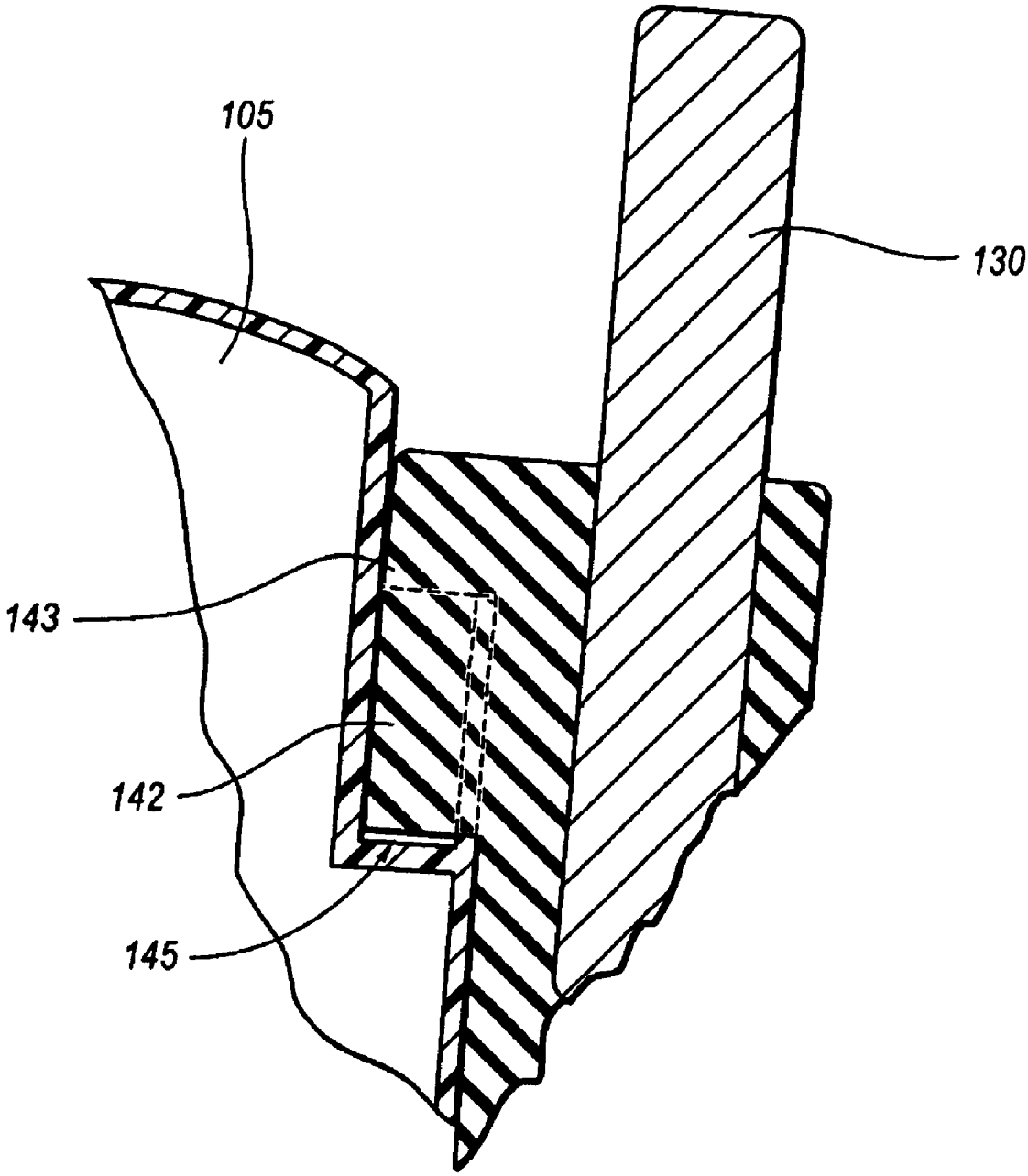
FIG. 5 is an enlarged, partial, cross-sectional view taken along line 5—5 in FIG. 4 and showing the male and female components in a mating configuration.

Female component 145 in the depicted embodiment comprises a slot. Slot 145 is formed in a T-shape and has a central slit 147. Slit 147 is configured to receive a corresponding central wall 142 formed as part of attachment member 140 (see FIG. 5). A transverse wall 143 is formed on the top portion of electrical connector 130 and interacts with the transverse slit 148 of slot 145 to limit the depth with which attachment member 140 may enter slot 145. Slot 145 defines a rectangular cavity which extends from one end of transverse slit 148 to the other end, and from transverse slit 148 to the opposite end of central slit 147, as indicated by dashed line 149 in FIG. 2. The cavity defined by slot 145 is enclosed by a wall at all points other than along slits 147 and 148. FIGS. 3 and 4 show device 100 after electrical connector 130 has been attached to mouse 105.

FIG. 2 also shows an optical component window 108 on the bottom surface of mouse 105. Optical component window 108 provides visual access to one or more optical mouse components—such as lasers, sensors, lenses, etc. Those of ordinary skill in the art will appreciate that optical component window 108 could be covered by a piece of glass or other translucent material or, alternatively, may just comprise an opening providing for access to one or more optical components. Because optical components tend to be fragile and expensive, some embodiments of the invention may allow for covering optical component window 108 during storage and/or between uses. For example, in the embodiment of FIG. 2, the device is configured such that, when the electrical connector 130 is attached to the optical mouse 105, the optical component window 108 is covered. The optical component window may, in some embodiments, be at least partially (or fully) covered by the cable storage mechanism. In some embodiments, the optical components may also, or alternatively, be covered by the electrical connector.

Of course, a variety of alternatives are contemplated. For example, although slot 145 is shown as being formed within mouse 105, it could instead be formed within connector 130. Attachment member 140 could then be formed on the mouse 105. In addition, whereas the slot 145 is shown as having been formed on a bottom surface of mouse 105, this need not be the case. For example, it could be formed on a side surface of the mouse. Moreover, the attachment member need not comprise a male/female set of interlocking components, as shown in the embodiment of FIGS. 1–5.

Figure 6:
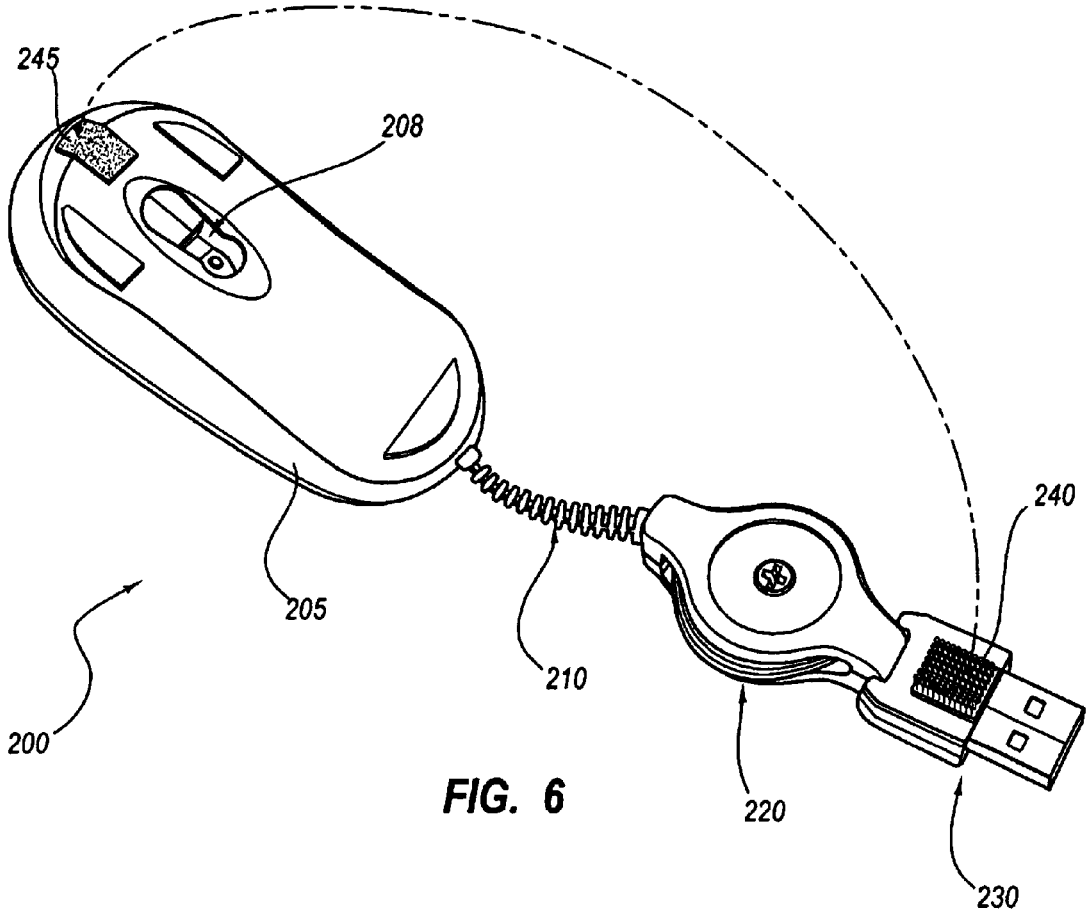
FIG. 6 is a perspective view of another embodiment of a portable mouse device having an alternative means for releasably attaching the electrical connector with the mouse.

For example, FIG. 6 depicts an alternative embodiment of a computer mouse device 200 wherein the attachment member comprises a fabric 240 with small hooks configured to fasten to a corresponding fabric 245 of small loops, such as the material sold under the VELCRO® trademark. In the depicted embodiment, fabric 240 is shown attached to electrical connector 230, and fabric 245 to mouse 205. However, the respective positions of the two pieces of fabric could, of course, be reversed. Moreover, it should be understood that the pieces of fabric could be attached at other locations on the device and still achieve the same objectives. Like the embodiment shown in FIGS. 1–5, computer mouse device 200 also includes a winding mechanism 220 for storage of cable 210, and an optical component window 208.

Winding mechanisms 120 and 220 are examples of means for winding at least a portion of a cable. Male attachment member 140 and slot 145, along with fabric pieces 240 and 245, are examples of means for releasably attaching an electrical connector with a computer mouse.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. The scope of the present invention should, therefore, be determined only by the following claims.

What is claimed is:

1. A computer mouse device, comprising:

a computer mouse comprising a cable extending therefrom;

a storage mechanism for storing at least a portion of the cable;

an electrical connector connected with the cable for electrically connecting the computer mouse with a computer; and an attachment member for releasably attaching the electrical connector with the computer mouse.

2. The computer mouse device of claim 1, wherein the attachment member comprises a male component configured to be received within a female component to releasably attach the electrical connector with the computer mouse.

3. The computer mouse device of claim 2, wherein the female component comprises a slot.

4. The computer mouse device of claim 3, wherein the slot is formed within the computer mouse.

5. The computer mouse device of claim 2, wherein the male component is attached to the electrical connector.

6. The computer mouse device of claim 1, wherein the computer mouse comprises an optical mouse, and wherein the optical mouse comprises an optical component window.

7. The computer mouse device of claim 6, wherein the attachment member is configured such that, when the electrical connector is attached to the optical mouse, the optical component window is at least substantially covered.

8. The computer mouse device of claim 7, wherein the attachment member is configured such that, when the electrical connector is attached to the computer mouse, the optical component window is at least partially covered by the storage mechanism.

9. The computer mouse device of claim 1, wherein the storage mechanism comprises a cable winding mechanism.

10. The computer mouse device of claim 1, wherein the electrical connector comprises a Universal Serial Bus connector.

11. A computer mouse device, comprising:

a computer mouse comprising a cable extending therefrom;

an electrical connector connected with the cable for electrically connecting the computer mouse with a computer;

means for winding at least a portion of the cable;

means for releasably attaching the electrical connector with the computer mouse.

12. The computer mouse device of claim 11, wherein the means for releasably attaching the electrical connector with the computer mouse comprises a male component configured to be received within a female component to releasably attach the electrical connector with the computer mouse.

13. The computer mouse device of claim 11, wherein the means for releasably attaching the electrical connector with the computer mouse comprises a fabric with small hooks configured to fasten to a corresponding fabric of small loops.

14. The computer mouse device of claim 11, wherein the computer mouse comprises an optical mouse, and wherein the optical mouse comprises an optical component window.

15. The computer mouse device of claim 14, wherein the means for releasably attaching the electrical connector with the computer mouse is configured such that, when the electrical connector is attached to the optical mouse, the optical component window is at least substantially covered.

16. The computer mouse device of claim 15, wherein the means for releasably attaching the electrical connector with the computer mouse is configured such that, when the electrical connector is attached to the optical mouse, the optical component window is at least partially covered by the winding means.

17. The computer mouse device of claim 11, wherein the electrical connector comprises a Universal Serial Bus connector.

18. A computer mouse device, comprising:

an optical mouse comprising a cable extending therefrom and further comprising an optical component window;

an electrical connector connected with the cable for electrically connecting the optical mouse with a computer;

a storage mechanism for storing at least a portion of the cable; and means for releasably attaching the electrical connector with the optical mouse, wherein the means for releasably attaching the electrical connector with the computer mouse is configured such that, when the electrical connector is attached to the optical mouse, the optical component window is at least substantially covered, and wherein when the optical component window is covered, the optical component window is at least partially covered by the storage mechanism.

* * * * *